(12) United States Patent
Singer (10) Patent No.: US 11,701,952 B2
(45) Date of Patent: Jul. 18, 2023

(54) TRUCK BED CLOSURE

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 17/943,108

(22) Filed: Sep. 12, 2022

(65) Prior Publication Data

US 2023/0138645 A1 May 4, 2023

Related U.S. Application Data

(63) Continuation of application No. 17/516,121, filed on Nov. 1, 2021, now Pat. No. 11,472,273.

(51) Int. Cl.
*B60J 7/02* (2006.01)
*B62D 33/027* (2006.01)
*B62D 33/037* (2006.01)
*B62D 33/023* (2006.01)
*B60J 7/08* (2006.01)
*B60J 7/00* (2006.01)

(52) U.S. Cl.
CPC ............. *B60J 7/02* (2013.01); *B60J 7/0023* (2013.01); *B60J 7/085* (2013.01); *B62D 33/023* (2013.01); *B62D 33/0276* (2013.01); *B62D 33/037* (2013.01)

(58) Field of Classification Search
CPC ............. B62D 33/023; B62D 33/0276; B62D 33/037; B60J 7/067; B60J 7/068; B60J 7/041; B60J 7/085; B60J 7/02
USPC ...... 296/98, 100.09, 100.11, 100.15, 100.16, 296/104, 105
See application file for complete search history.

(56) References Cited

U.S. PATENT DOCUMENTS

| | | | | |
|---|---|---|---|---|
| 3,447,830 A * | 6/1969 | Willson | ................ | B62D 33/08 296/165 |
| 5,186,231 A | 2/1993 | Lewis | | |
| 5,259,659 A * | 11/1993 | Inaba | ...................... | B60J 5/067 280/143 |
| 6,206,448 B1 * | 3/2001 | Haddad, Jr. | .............. | B60J 7/085 296/100.01 |
| 6,439,646 B1 | 8/2002 | Cornelius | | |

\* cited by examiner

*Primary Examiner* — Dennis H Pedder
(74) *Attorney, Agent, or Firm* — KOS IP Law LLP (57) ABSTRACT

A retractable truck bed closure is disclosed herein. The retractable truck bed closure comprises a pair of frames that extend across a truck bed between sidewalls of the truck bed. The closure may be moved between a stored configuration and an extended configuration along the pair of frames to open, and close, a portion of the truck bed, respectively. The frames may be attachable to the truck, or may be integrated into portions of the truck, such as the sidewalls of the truck bed or the rear of the cab of the truck.

15 Claims, 11 Drawing Sheets

TRUCK BED CLOSURE

CROSS-REFERENCE TO RELATED APPLICATIONS

This application is a continuation application of U.S. patent application Ser. No. 17/516,121, filed on 2021 Nov. 1, the entire contents of which is expressly incorporated herein by reference.

STATEMENT RE: FEDERALLY SPONSORED RESEARCH/DEVELOPMENT

Not Applicable

BACKGROUND

The various aspects and embodiments described herein relate to a truck bed closure.

Trucks are one of the most popular types of vehicles being sold in the United States and abroad. Users will accessorize the truck with a variety of functional components in order to fit their lifestyle and needs. However, in doing so, they may add certain functionality but also disable other functional aspects of the truck.

Accordingly, there is a need in the art for improvement in accessorizing trucks.

BRIEF SUMMARY

The various aspects and embodiments described herein address the deficiencies discussed above, discussed below and those that are known in the art.

A truck bed closure is disclosed herein which has a closure that may be moved between two configurations—a storage configuration wherein the closure is not disposed over the truck bed, and an extended configuration wherein the closure is disposed over the truck bed. The closure may extend across a width of the truck bed from one sidewall to another sidewall, and may block a user from accessing a portion of the truck bed from a location above the truck bed when the closure is moved to the extended configuration. When the closure is moved to the extended configuration, the truck bed closure may form a closed interior volume with the truck bed acting as a floor of the closed interior volume. The closure may be disposed under the roof of the cab in the storage configuration, and above the roof of the cab in the extended configuration, to form a closed interior volume that extends above the roof of the cab. When the closure is moved to the storage configuration, a full length of the truck bed may be accessible from a location above the truck bed. The closure may move between the configurations along a track or a rail that extends across the width of the truck bed.

The truck bed closure may have a front frame with an upper front track and a rear frame with an upper rear track. The front frame may be located above a front portion of the truck bed and the rear frame may be located above a rear portion of the truck bed. Opposing sides of the closure may be mechanically coupled to the upper front track and the upper rear track such that the closure spans the length of the truck bed. The closure may be configured to move along the upper front track and the upper rear track when being moved between the storage configuration and the extended configuration. The closure may be extended from the right sidewall to the left sidewall or from the left sidewall to the right sidewall depending upon the configuration.

The front frame and the rear frame may be shaped in an arc to match the shape of the roof of the truck cab, allowing for the extended closure be arch-shaped to closure the truck bed. The front frame and rear frame may be attachable to the truck in any suitable manner, for example by coupling to the rear surface of the truck cab, or by coupling to an upper surface of the sidewalls of the truck bed. The front frame may be attachable to a front section of the left sidewall and to a front section of the right sidewall, whereas the rear frame may be attachable to a rear section of the left sidewall and to a rear section of the right sidewall. The front frame and the rear frame may be attachable to the truck, for example by attaching to the cab of the truck or to the sidewalls of the truck bed such as the stake pockets at the top sides of the left and right sidewalls. Alternatively, the front frame and/or the rear frame may be integrated to the truck. For example, the front frame may be integrated into the rear wall of the cab of the truck, and the rear frame may be integrated into the sidewalls of the truck. The front and rear frames may also be removable from the left and right sidewalls. For example, the front and rear frames may be attached to the left and right sidewalls with a quick detach latch. The quick detach latch may only require one or two movements (e.g., push lever or button, pull lever or button, push-pull lever and/or button, pull-push lever and/or button) to detach.

The front frame and the rear frame may have a track that the closure follows when being moved between the storage configuration and the extended configuration. The closure may have one or more sliders that may be mounted to the tracks to help the closure slide between the storage configuration and the extended configuration. The closure may comprise any suitable material, such as a flexible fabric that unrolls into the extended configuration and rolls up into the storage configuration, or may comprise a plurality of rigid slats that are rotatably joined together by strut joints. A closure storage box may be used to house a portion of the closure when the closure is moved to the storage configuration. For example, a closure storage box may have a pin with a spring that biases the pin to pull the end of the closure to wrap the closure around the pin, allowing for the pin to naturally pull the closure into a storage configuration wrapped around the pin. A locking mechanism may be used to hold the closure in the extended configuration to prevent the spring from pulling at the end of the closure when the locking mechanism is engaged.

Alternatively, the closure storage box may be disposed along a sidewall and the base of the truck bed to hold a closure comprising a plurality of slats that are joined together by strut joints. The storage box may also have a lower front track and a lower rear track that may be used to guide the closure in and out of the storage box when moving the closure between the storage configuration and the extended configuration, respectively.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
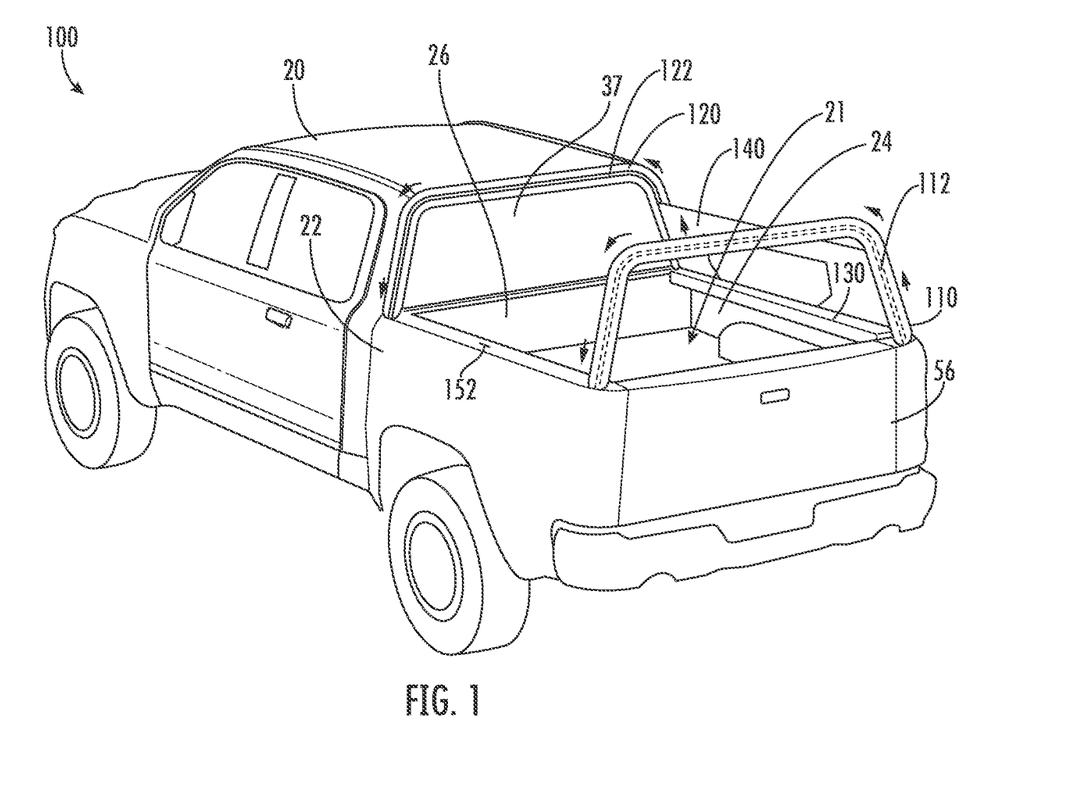
FIG. 1 is a perspective view of a truck having an embodiment of a retractable closure.

Referring now to the drawings, a truck 100 has a cab 20 having a rear window 37 shown in FIG. 1. Behind the truck cab 20, the truck 100 may have a truck bed 21 formed by a left sidewall 22, a right sidewall 24, a cab wall 26, and a tailgate 56. A retractable closure 140 may extend from a closure storage box 130, such that the retractable closure 140 may be moved between an extended configuration outside the storage box 130 and closing the truck bed 21 shown in FIG. 4, and a storage configuration stored largely within the storage box 130 shown in FIG. 6. When the retractable closure 140 is retracted into the storage box 130 in its storage configuration shown in FIG. 6, a user may have full access to the truck bed 21 of the truck 100 shown in FIG. 1. When the retractable closure 140 is pulled out of the storage box 130 in its extended configuration shown in FIG. 4, a user may have a protected interior volume that is formed under the closure 140 to protect any items placed in the truck bed 21 of the truck 100. In this manner, the retractable closure 140 may provide for full access to the truck bed 21 when the retractable closure 140 is in the storage configuration and may provide for a protected interior volume of the truck bed 21 when the retractable closure 140 is in the extended configuration.

The retractable closure 140 may be disposed to be movable on tracks. For example, shown best in FIG. 3, the front frame 120 may have a track 122, and the rear frame 110 may have a track 112. The front and rear edges of the retractable closure may be disposed to follow the track 122 and the track 112, respectively, when a user moves the retractable closure 140 between the storage configuration and the extended configuration. As shown in FIG. 1, the tracks 122, 112, may extend between the right sidewall 24 to the left sidewall 22 to allow the closure 140 to closure an entire section of the truck bed 21 between the sidewalls 22, 24 when the closure 140 is extended via the tracks 112, 122. Each track, 112, 122 may each comprise a groove or a recess within which an edge of the closure 140 may be inserted into, which provides a guide for a user that pulls or pushes the handle 144 of the closure 140. A slider, such as the slider 148 shown in FIG. 3, may mate with the track 122 to help the edge of the closure 140 follow the track 122 when being moved between the storage configuration and the extended configuration. Such a slider may be particularly useful when the closure is made of a flexible material that may fold if the edges of the closure 140 are not coupled to the tracks 122, 112.

Figure 2:
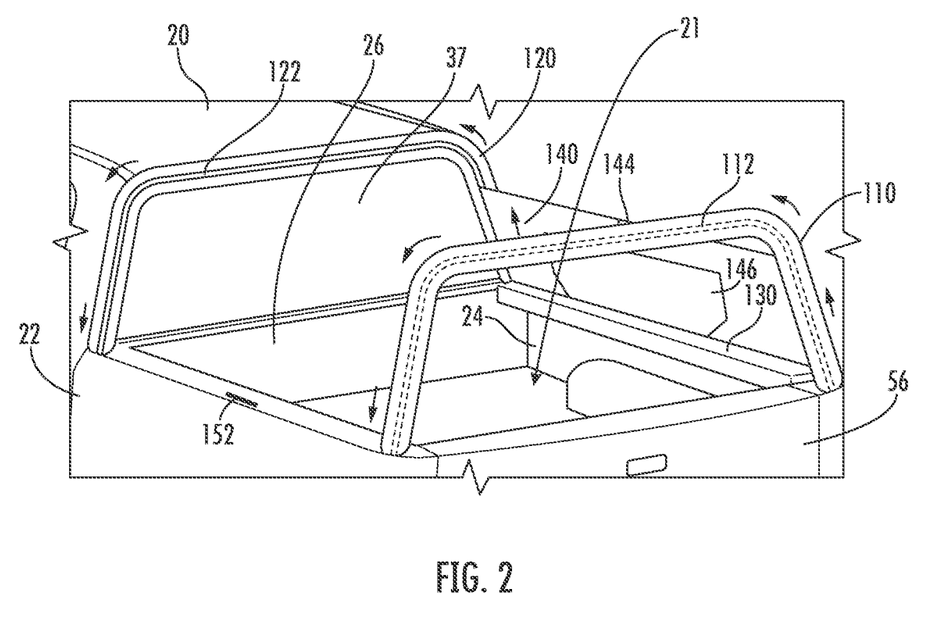
FIG. 2 is a zoomed-in view of a portion of the retractable closure of FIG. 1.
Figure 3:
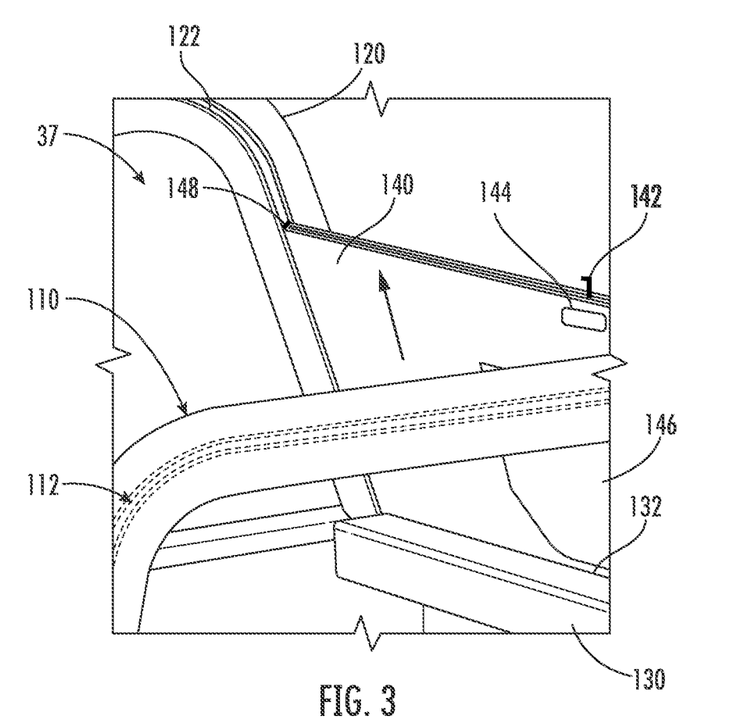
FIG. 3 is a zoomed-in view of a portion of the retractable closure of FIG. 1.
Figure 4:
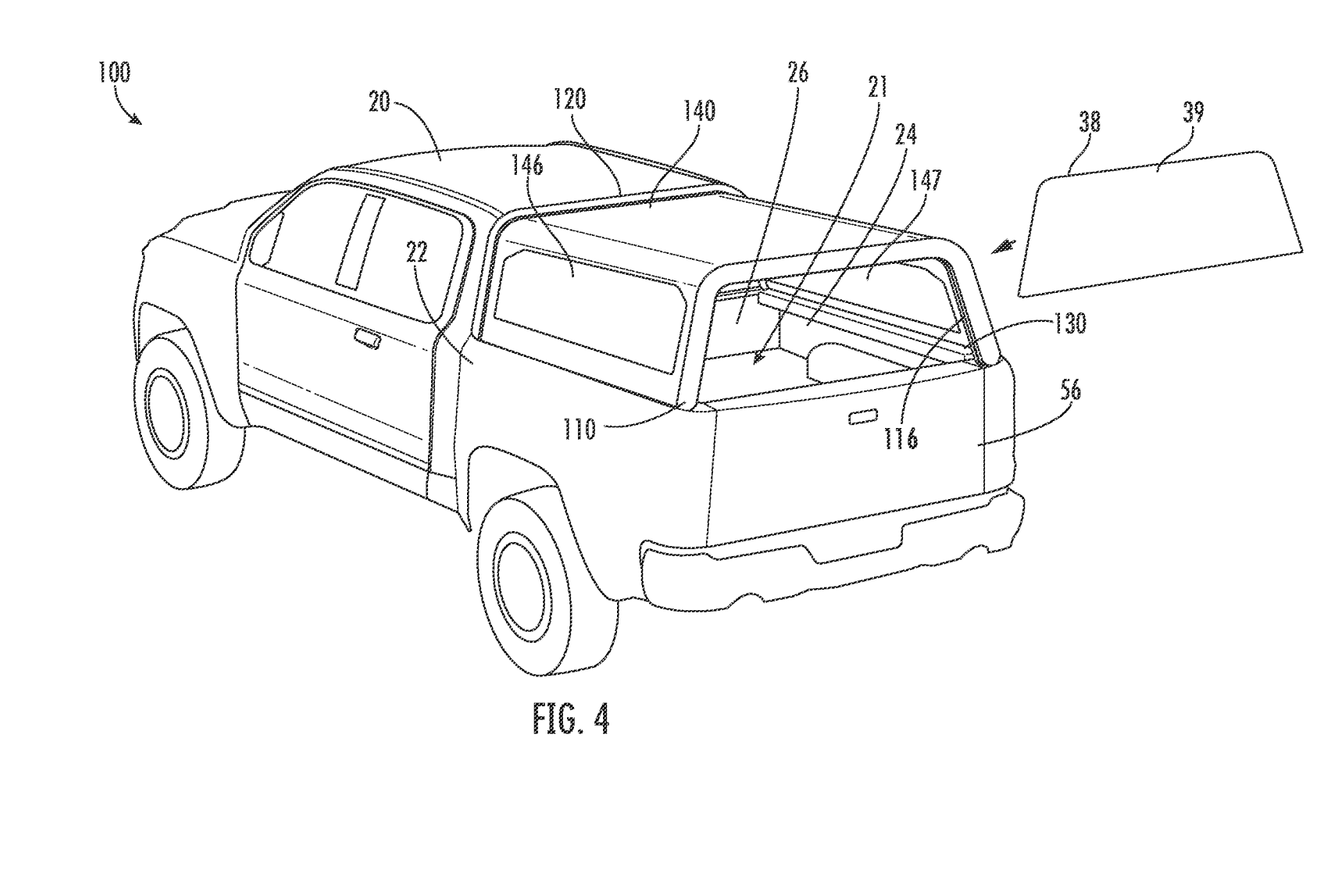
FIG. 4 shows a perspective view of the truck of FIG. 1 when the retractable closure is deployed and as a rear window is being attached.

As shown in FIG. 3, the retractable closure 140 may have a latch 142 that is sized and disposed to mate with the recess 152 shown in FIG. 2. The latch 142 and recess 152 may cooperatively operate as a locking mechanism to lock the retractable closure 140 in place relative to the left sidewall 22 when the retractable closure 140 is fully extended as shown in FIG. 4. While the retractable closure 140 is shown in FIGS. 1 and 4 as being extendable from the right sidewall 24 to the left sidewall 22, the retractable closure 140 may be configured to extend from the left sidewall 22 to the right sidewall by reversing the closure storage box 130 and coupling the storage box 130 to the left sidewall 22.

Figure 5:
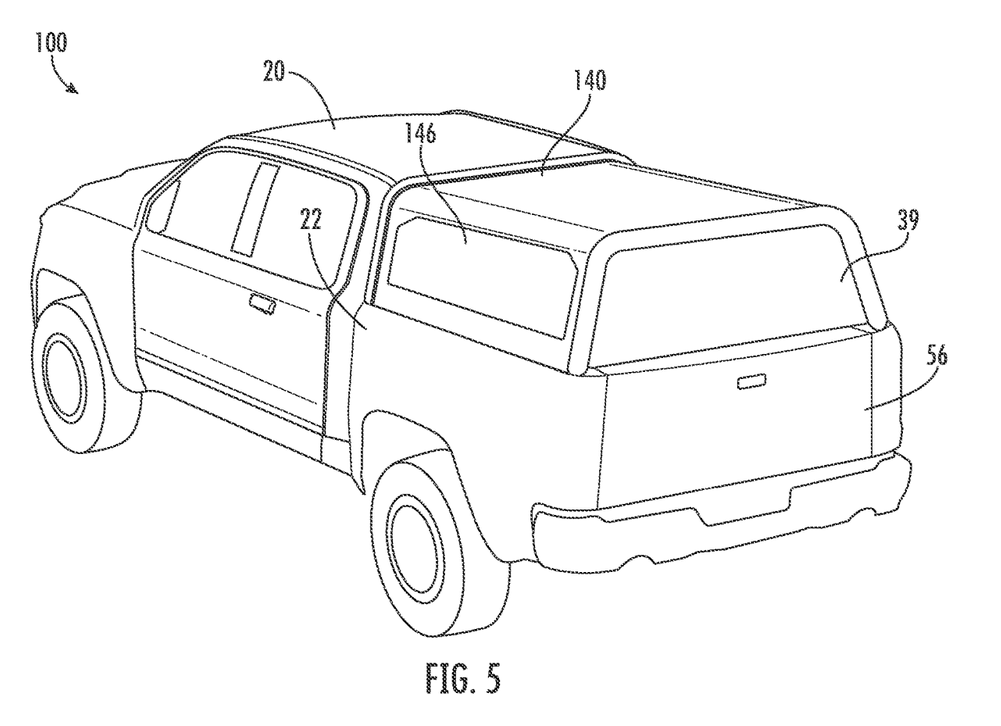
FIG. 5 shows a perspective view of the truck of FIG. 4 having the rear window installed in the rear frame of the retractable closure.

As shown in FIG. 4, the rear frame 110 may have an inner recess 116 that is shaped to accept an edge 38 of a rear window 39. The rear window 39 may be detachable and attachable to the rear frame 110 depending upon need. When attached, the rear window 39 may be pivoted up and held up with a telescoping member. The recess 116 of the rear frame may hold the rear window 39 in place relative to the rear frame 110 to close an opening to the protected interior volume that is formed under the closure 140 to protect items placed in the truck bed 21. Alternatively, the rear frame 110 may be formed to be integral with the rear window 39. As shown in FIG. 5, when the closure 140 is extended via the rear frame 110 and the front frame 120 to closure the truck bed 21, and the rear window 39 is coupled to the rear frame 110, the closure 140 and the rear window 39 may block access to the protected interior volume that is formed under the closure 140 to protect items placed in the truck bed 21 (shown in FIG. 4).

Figure 6:
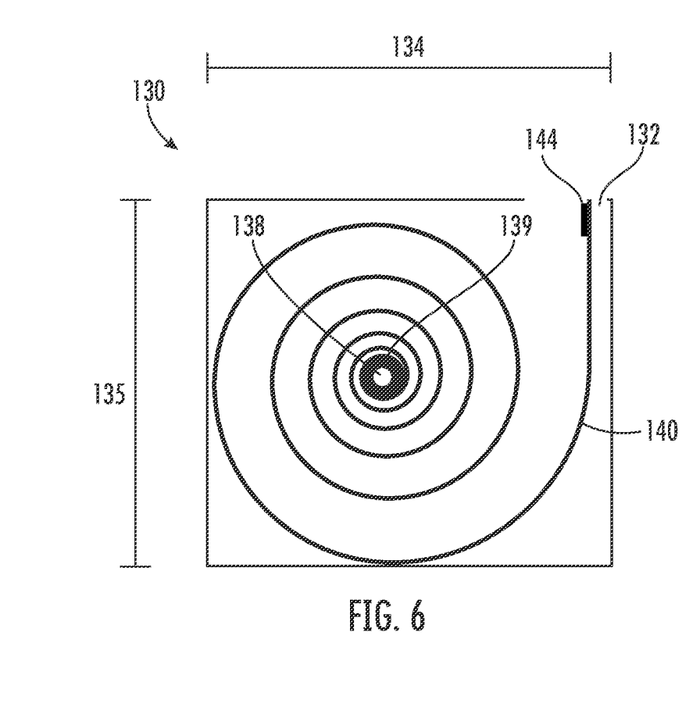
FIG. 6 shows a cross-sectional view of a storage box of the retractable closure of FIG. 1.

As shown in the cross-sectional view of FIG. 6, the closure 140 may be rolled up in the storage box 130 of FIG. 1 in a rolled-up storage configuration. The closure 140 may be rolled up around a pin 138 (see FIG. 6) having a spring 139 that is biased to pull the closure 140 into the rolled-up storage configuration shown in FIG. 6. When a user pulls on the handle 144 with a force greater than the bias of the spring 139, the force unrolls the closure 140 about the pin 138 counterclockwise (as shown in FIG. 6) through the gap 132 in the storage box 130. The user may pull the handle 144 until the closure 140 fully extends to the extended configuration (see FIG. 4) and may engage the latch 142 (see FIG. 3) to mate with the recess 152 (see FIG. 2) to lock the closure 140 in place relative to the left sidewall 22 (see FIG. 4) of the truck 100. When a user disengages the latch 142, the natural bias of the spring 139 (see FIG. 6) may then roll the pin 138 clockwise (as shown in FIG. 6) to pull the closure 140 into the storage box 130 through the gap 132 to the storage configuration. While a spring 139 is shown to pull the closure 140 to the storage configuration, other methods of rolling the closure 140 about the pin 138 may be used. For example, a user may manually roll the closure 140 about the pin 138, or may turn a crank coupled to an axis of the pin 138 to roll the closure 140 about the pin 138.

Figure 7:
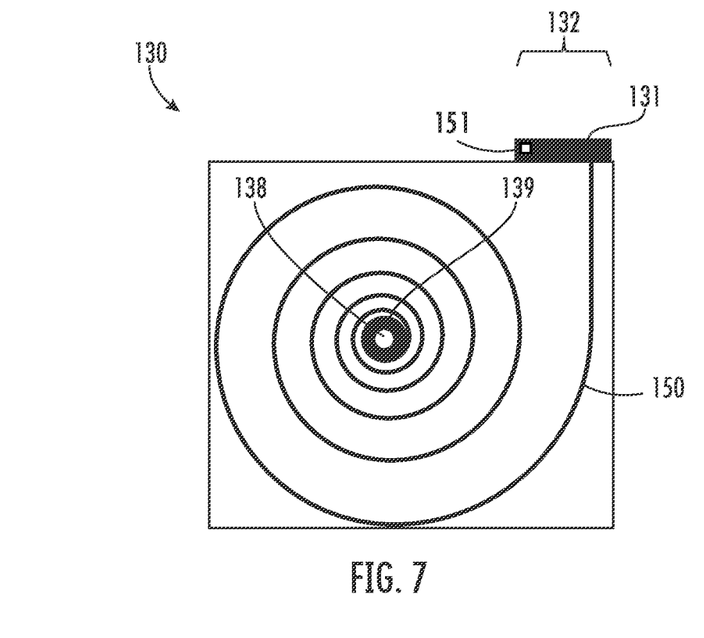
FIG. 7 shows a cross-sectional view of an alternative storage box for a retractable closure.
Figure 8:
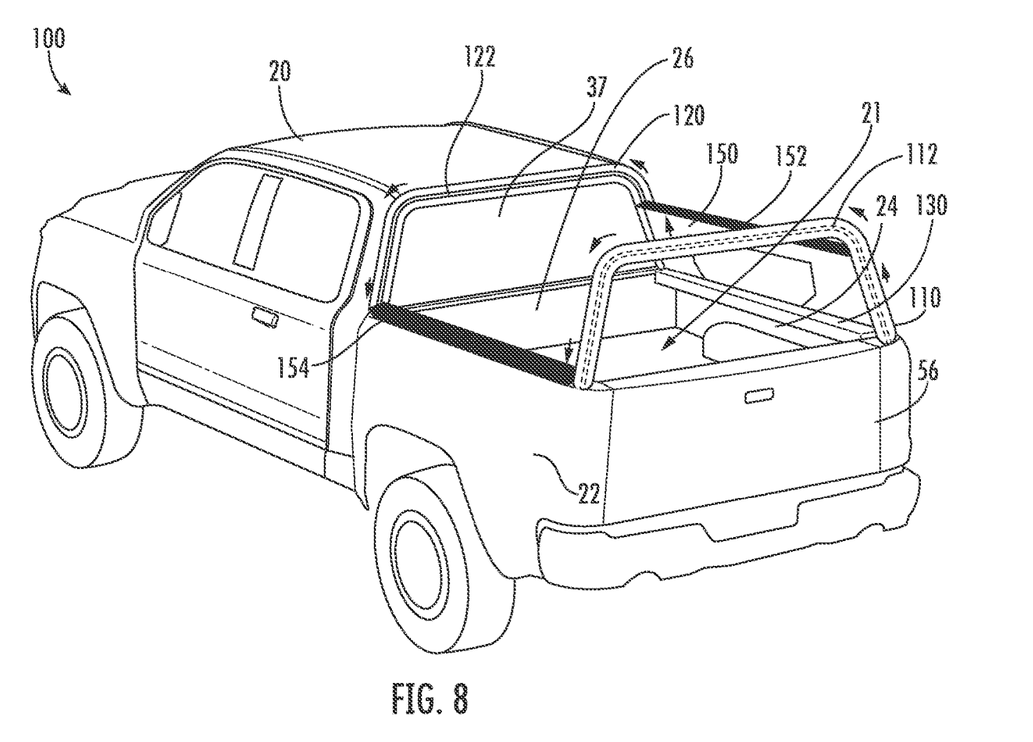
FIG. 8 shows a perspective view of a truck having an alternative embodiment of a retractable closure using the alternative storage box of FIG. 7.
Figure 9:
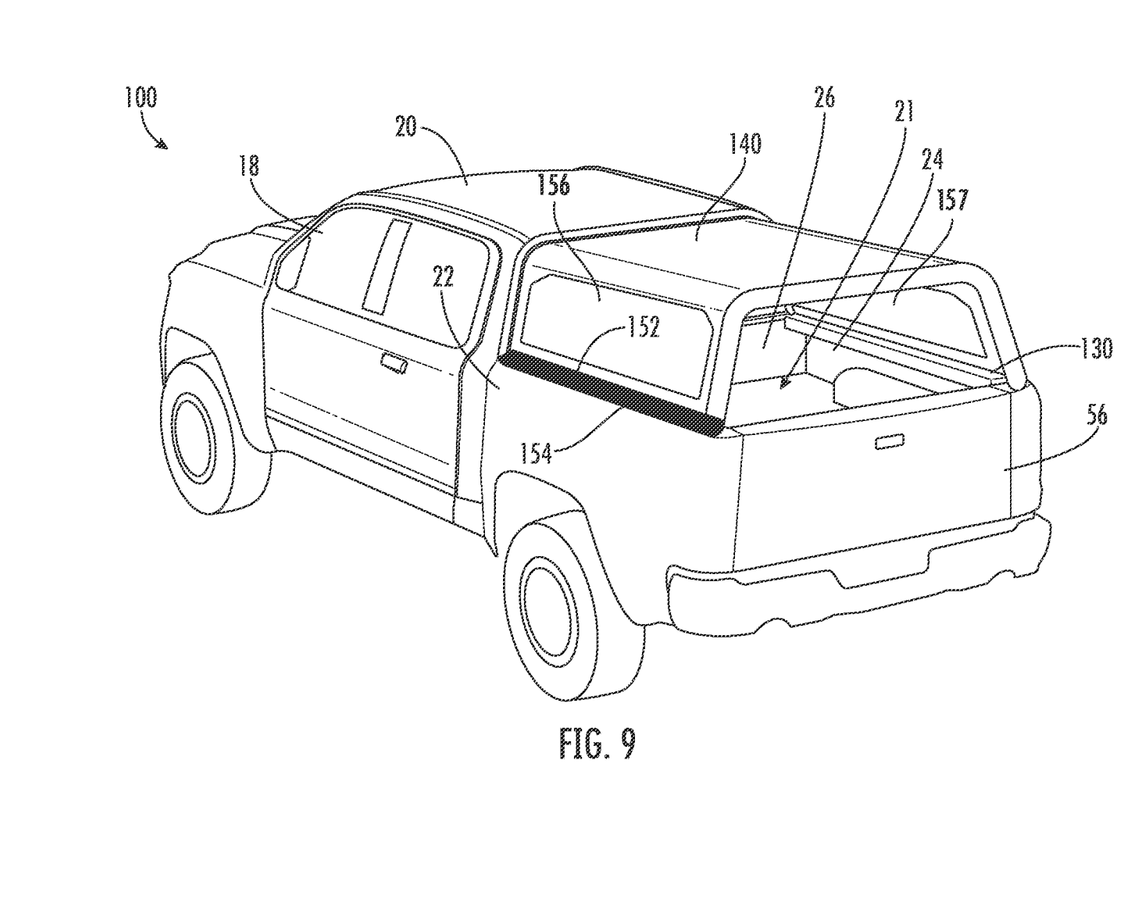
FIG. 9 shows a perspective view of the truck of FIG. 8 when the retractable closure is deployed.

As shown in the cross-sectional view of FIG. 7, an alternative closure 150 may be stored in the storage box 130, having a magnet 152 that may be coupled to the end of the closure 150. The magnet 152 may be made to have a width that is wider than the gap 132 of the storage box 130, which may prevent the magnet 152 from entering the storage box 130 when the spring 139 pulls the closure 150 into the storage configuration shown in FIG. 7. As shown in FIG. 8, the magnet 152 may be sized and disposed to magnetically couple with the matching ferrous plate 154 disposed along the top of the left sidewall 22 of the truck 100. As shown in FIG. 9, when a user fully extends the closure 150 via the front frame 120 and the rear frame 110, the magnet 152 and the ferrous plate 154 may mate with one another to hold the closure 150 in place relative to the left sidewall 22.

Figure 10:
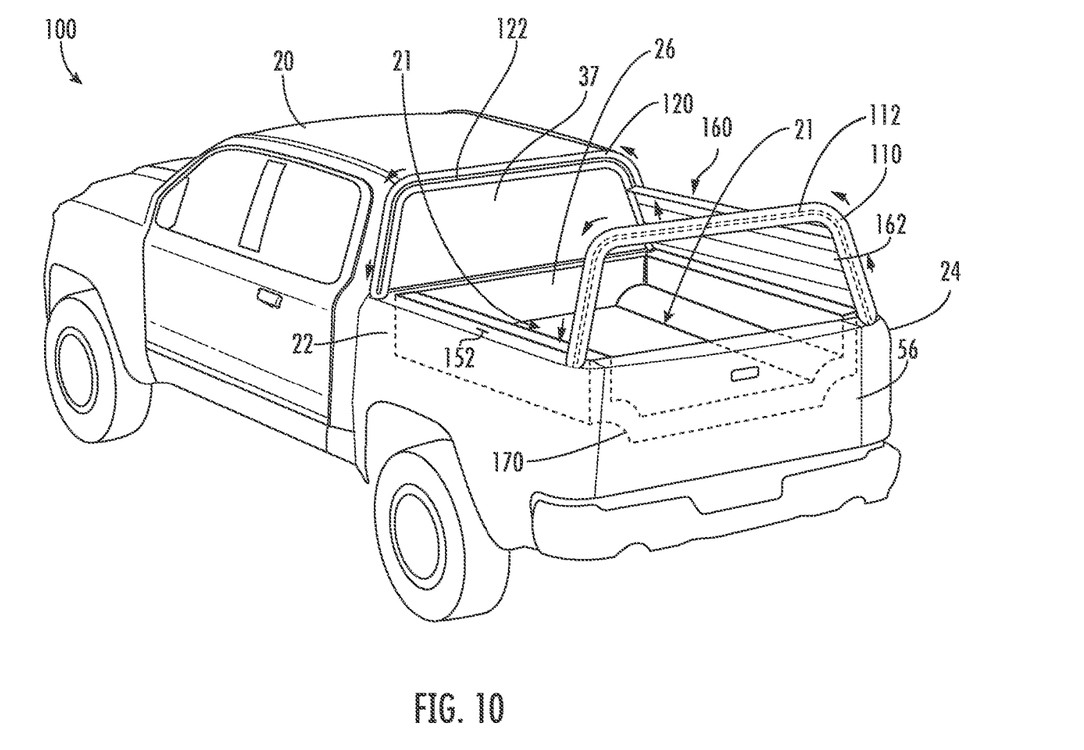
FIG. 10 shows a perspective view of a truck having an alternative embodiment of a retractable closure.

An alternative closure 160 is shown in FIG. 10, used to closure the truck bed 21 of the truck 100. The closure 160 may comprise a series of slats 162 (shown in FIG. 12) that are rotationally coupled to one another via strut joints 163. A user may apply force to the handle 161 of the closure 160 to move the closure 160 in and out of the storage box 170. When the closure 160 moves out of the storage box 170, the closure may traverse between the storage configuration shown in FIG. 12 and the extended configuration shown in FIG. 11 by traveling along the front track 122 and the rear track 112 formed in the front frame 120 and the rear frame 110, respectively. When the user fully extends the closure 160, the closure 160 may closure the truck bed 21 of the truck 100 as shown in FIG. 11.

Figure 11:
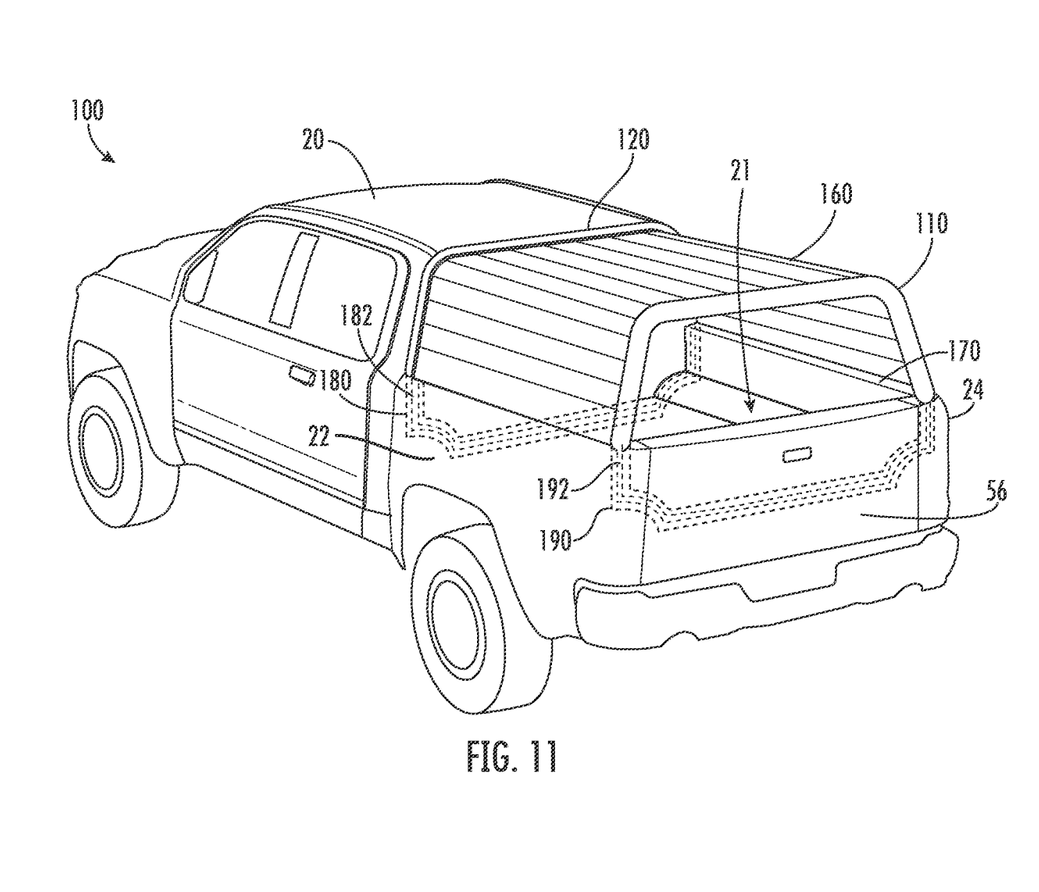
FIG. 11 shows a perspective view of the truck of FIG. 10 when the retractable closure is being deployed and a rear window is being attached.
Figure 12:
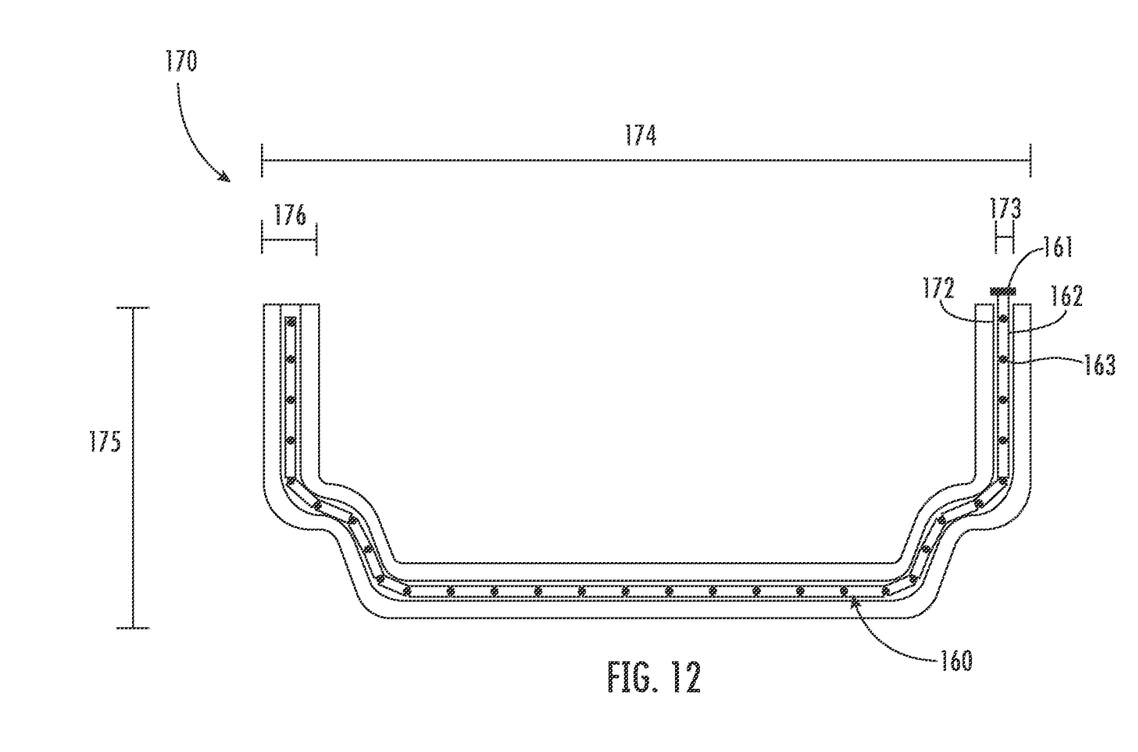
FIG. 12 shows a cross-sectional view of the storage box of the retractable closure of FIG. 10.

The closure 160 may be configured to be movable between the extended configuration shown in FIG. 11 and the storage configuration shown in FIG. 12 by sliding along the upper front track 122 of the front frame 120 (see FIG. 10), the lower front track 182 of the lower front frame 180 (see FIG. 11), the upper rear track 112 of the rear frame 110 (see FIG. 10), and the lower rear track 192 of the lower rear frame 190 (see FIG. 11). A storage box 170 (see FIG. 10) may be positioned along the perimeter of the truck bed 21 to hold the closure 160 in its storage configuration within the storage box 170, best shown in FIG. 12. A user may pull on the handle 161 of the closure 160 to pull the closure 160 from the storage box 170 to extend the closure 160 to the extended configuration shown in FIG. 11 and may push on the handle 161 of the closure 160 to push the closure 160 into the gap 172 of the storage box 170 to move the closure 160 into the storage configuration shown in FIG. 12.

The closures 140 (FIG. 5), 150 (FIG. 9) and FIG. 160 (FIG. 11) are discussed herein in relation to a truck 100, respectively. However, it is also contemplated that the closures 140, 150, and 160 may also be mounted to any type of vehicle having a cargo area with an open top area. By way of example and not limitation, the closures 140, 150, and 160, respectively, may also be mounted to a golf cart having an open cargo area or container behind the passenger area. Additionally, the closures 140, 150, and 160 may be mounted to a container having an open top.

Referring now to FIGS. 1-2, a first embodiment of an extendible closure 140 is shown for a truck 100 having a cab 20. Behind the truck cab 20, the truck 100 may have a truck bed 21 formed by a left sidewall 22, a right sidewall 24, a cab wall 26, and a tailgate 56. As discussed above, the closure 140 may be mounted to other types of vehicles as well as to a container. In this regard, the walls of such a container may be the functional equivalent of the left sidewall 22, right sidewall 24, cab wall 26, and tailgate 56. The truck cab 20 may also have a cab window 37 located above the cab wall 26 to form a barrier between the truck bed 21 and the cab 20.

The truck 100 may have a front frame 120 and a rear frame 110. The front frame 120 may be mounted to a front portion of the left sidewall 22 and to a front portion of the right sidewall 24. The rear frame 110 may be mounted to a rear portion of the left sidewall 22 and to a rear portion of the right sidewall 24. The front frame 120 and the rear frame 110 may be attached to the left sidewall 22 and the right sidewall 24 in any suitable manner, for example by using screws, nails, adhesives, or slidable tracks that lock into place using a friction fit locking mechanism or a lock. The front and rear frames 120, 110 may be attached to the left and right sidewalls 22, 24 at the stake pockets of the left and right sidewalls 22, 24. The front frame 120 may also be, or may alternatively be, attached to the cab 20. Such an embodiment may be useful where the cab 20 is integral to the left sidewall 22 and the right sidewall 24. The front frame 120 may have a front track 122 and the rear frame may have a rear track 112. The edges of the closure 140 may be sized and disposed to mate with both the front track 122 and the rear track 112 such that the front track 122 and the rear track 112 guide the closure 140 as the closure 140 slides between the storage configuration and the extended configuration.

The front and rear frames 120, 110 may also be removable from the left and right sidewalls 22, 24. For example, the front and/or rear frames may be attached to the left and right sidewalls with a quick detach latch. The quick detach latch may only require one or two movements (e.g., push lever or button, pull lever or button, push-pull lever and/or button, pull-push lever and/or button) to detach.

FIG. 3 shows a close-up of the closure 140 with a handle 144 that helps a user to pull the closure 140 out from the gap 132 of the storage box 130 in order to extend the closure 140 over the truck bed 21 (see FIG. 2) via the front track 122 and the rear track 112. The front track 122 may comprise a recess that is sized to mate with a slider 148 (see FIG. 3) of the closure 140 and help guide the closure 140 between the storage configuration and the extended configuration. An opposing slider (not shown) may be used to mate the opposing edge of the closure 140 with the track 112 of the rear frame 110.

The sliding track 122 may have one or more races. Each race of the sliding track 122 may be attached to the slider 148 of the closure 140. The slider 148 may comprise one or more tongues and the sliding track 122 may comprise one or more grooves that receive the tongue(s) of the slider 148. Alternatively, the slider 148 may comprise a groove that receives a tongue of the sliding track 122, or the slider 148 and the track 122 may comprise a ball bearing engagement between the two so that the weight of the closure 140 does not hinder sliding movement along the front frame 120. A matching slider (not shown) may be used to attach the opposite edge of the closure 140 to the rear track 112 of the rear frame 110. Any suitable sliding engagement mechanism may be used between the closure 140 and the front track 122 of the front frame 120 and the rear track 112 of the rear frame 110. For example, an edge of the closure 140 may be shaped to have a width that is slightly smaller (e.g., 1 or 2 mm smaller) than the width of a recess of the track 122, which may allow the edge of the closure 140 to simply slide along the recess of the track 122 when a user pulls or pushes on the handle 144 of the closure 140. The track 122 of the front frame 120 may be parallel to the track 112 of the rear frame 110 to allow the closure 140 to be aligned between the front frame 120 and the rear frame 110 when the closure 140 is moved between the storage configuration and the extended configuration.

The front frame 120 and the rear frame 110 may each be fabricated from a rigid tubular material. While the front frame 120 and the rear frame 110 are shown in FIG. 1 as having an arched shape, the front frame 120 and the rear frame 110 may be shaped to have any suitable shape to closure the truck bed 21 of the truck 100, such as a rectangular shape or a trapezoidal shape. Contemplated materials for the front frame 120 and the rear frame 110 include, but are not limited to, fiberglass, carbon fiber, aluminum, metal, plastic, or solid bar. The front frame 120 and the rear frame 110 may be fabricated from a material that can withstand wind and driving forces due to the truck 100 driving on the freeway at speeds of up to 65-90 mph and cornering.

The closure 140 may have a latch 142 that is sized to mate with the recess 152 shown in FIG. 2 along the top edge of the left sidewall 22 of the truck 100. The latch 142 is shown in FIG. 3 as extended from an edge 143 of the closure 140, but the latch 142 may be configured to rotate between the extended configuration shown in FIG. 3 to a recessed position folded within a recess of the edge 143 by engaging a rotational mechanism in the handle 144. The latch 142 (see FIG. 3) and the recess 152 (see FIG. 2) may cooperatively form a locking mechanism that may be used to hold the closure 140 in place relative to the left sidewall 22 of the truck 100, such that the closure 140 is not easily pulled from its extended configuration to the storage configuration. A user may engage and disengage the latch 142 by operating a rotational locking mechanism in the handle 144 that rotates the latch 142 between a locked position and an unlocked position.

FIG. 4 illustrates the truck 100 when a user fully extends the closure 140 and locks the latch 142 with the recess 152. The closure 140 may have a left window 146 and a right window 147 that are made of a transparent material, such as a transparent plastic, that may allow a user to look into the truck bed 21 when the closure 140 is fully extended over the truck bed 21. A rear window 39 may be configured to mate with the rear frame 110 by having an edge 38 that fits within a recess 116 of the rear frame 110. When the rear window 39 is coupled to the rear frame 110, the truck bed 21 may be fully enclosed, as is shown in FIG. 5, by the closure 140 having left window 146 and right window 147 (shown in FIG. 4), and the rear frame 110 having the window 39.

The closure 140 may be fabricated from one or more flexible materials, such as a flexible plastic, vinyl, canvas, or cloth, to allow for the closure 140 to roll up through the gap 1132 of the storage box 130 shown in FIG. 3. The closure 140 may comprise a plurality of windows, such as the left window 146 and the right window 147 shown in FIG. 4, which may be made of the same, or different, materials as the rest of the closure 140. For example, the body of the closure 140 may be made of a flexible, opaque cloth, while the left window 146 and the right window 147 may be made of a flexible, transparent or translucent plastic. While only one closure 140 is shown as being extended from the right sidewall 24 to the left sidewall 22, a plurality of closures may be extended from the right sidewall 24 to the left sidewall 22, positioned parallel to one another between a plurality of frames extended between the left sidewall 22 and the right sidewall 24. The closure 140 and the frames 110 and 120 when in the deployed state shown in FIGS. 4 and 5 may be waterproof so that rainwater does not and cannot enter the truck bed area 21. To this end, the junctions between the closure 140 and the frames 110 and 120 may have rubber seals or other sealing mechanisms for keep the water out of the truck bed area 21. The inner recess 116 of the rear frame 110 and the upper edge of the tailgate 56 may also have a rubber seal or other sealing mechanisms to help to waterproof the seal about the rear window 39 to prevent water from entering the truck bed area 21.

The closure 140 may be sufficiently wide enough in order to engage both the front frame 120 and the rear frame 110. More particularly, the closure 140 may form a watertight seal along the topsides of the front frame 120 and the rear frame 110 to provide a dry interior volume over the truck bed 21. The closure 140 may have a rubber seal along the outer peripheral edges that engage the front frame 120 and the rear frame 110 to form such a watertight seal. The rubber seal may form a valve about the sliders of the closure 140, such as the slider 148 of the closure 140 shown in FIG. 3.

The closure 140 may be configured to roll up into the storage box 130 in the configuration shown in FIG. 6. The storage box 130 may have a width 134 and a height 135 suitable to allow for a flexible closure 140 that extends across the front frame 120 and the rear frame 110 of FIG. 1 to fit within the storage box 130 in a rolled-up storage configuration. The storage box 130 may have a width of at least 3 inches and a height of at least 3 inches to accommodate such a closure 140. The closure 140 may have a gap 132 in the storage box 130 that allows a section of the closure 140 to unroll through the gap 132 to the extended configuration shown in FIG. 5. The perimeter of the gap 132 may have cushions about the edges of the gap 132 to prevent the closure 140 from catching or tearing along the edges of the gap 132 as it is moved between the storage configuration and the extended configuration. For example, rubber cushions could be attached to the edges of the gap 132 to provide a cushion to protect the closure 140 while it is moved between configurations.

The closure 140 may be rolled up around a pin 138 having a spring 139 that is biased to pull the closure 140 into the rolled-up storage configuration shown in FIG. 6. The spring 139 may comprise a flexible metal that stretches to allow the pin 138 to fully unroll and allow the closure 140 to be extended to its full extended configuration as shown in FIG. 5. The spring 139 may be biased to pull the closure 140 back to its original configuration rolled up about the pin 138. As such, when a user pulls on the handle 144, the force of the user pulling upwards on the handle 144 may unroll the closure 140 about the pin 138 counterclockwise (as shown in FIG. 6) through the gap 132 in the storage box 130. As the closure 140 continues to unroll, the force about the spring 139 may increase due to the stretching that occurs to the spring 139 as the closure 140 continues to unroll. The user may pull the handle 144 until the closure 140 fully extends to the extended configuration shown in FIG. 4 and may engage the latch 142 shown in FIG. 3 to mate with the recess 152 shown in FIG. 2 to lock the closure 140 in place. The latch 142 may be configured to withstand the pulling force of the spring 139 on the closure 140 when the closure 140 is fully extended out of the storage box 130. While only one latch 142 is shown in FIG. 3 and one recess 152 is shown in FIG. 2, a plurality of latches and recesses may be used to provide for a plurality of locking mechanisms between the closure 140 and the left sidewall 22 to hold the closure 140 in the extended configuration shown in FIG. 4.

When a user disengages the latch 142 of FIG. 3 from the recess 152 of FIG. 2, the spring 139 of FIG. 6 may then exert its biasing force to roll the pin 138 clockwise (as shown in FIG. 6) to pull the closure 140 in through the gap 132 in the storage box 130 to the storage configuration shown in FIG. 6. Spring 139 may be configured to only partially roll the pin 138 clockwise, allowing for the handle 144 to stick out of the gap 132 of the storage box when the biasing force of the spring 139 is fully spent and there is no longer a biasing force pulling the closure 140 to roll clockwise (as shown in FIG. 6). While a latch and recess is shown as the locking mechanism used to latch the closure 140 to the left sidewall 22 in place, other locking mechanisms may be used, such as a deadbolt or a threaded screw locking mechanism.

FIG. 7 shows an alternative locking mechanism with a closure 150 having a magnet 152 coupled to an end of the closure 150. The magnet 152 may be configured to have a width that is wider than the gap 132 of the storage box 130, which may prevent the magnet 152 from entering the storage box 130 when the spring 139 pulls the closure 150 into the storage configuration shown in FIG. 7. Since the magnet 152 has a width that is larger than the width of the gap 132 of the storage box 130, the spring 139 may be biased to fully pull the closure 150 into the storage box 130, as the end of the closure 150 with the magnet 152 is in no danger of being pulled into the storage box 130. When the spring 139 pulls the closure 150 clockwise, the magnet 152 may abut against the exterior surface of the storage box 130 about the gap 132, preventing the magnet 152 from entering the gap 132.

As shown in FIG. 8, the magnet 152 may extend across a length of the closure 150 from edge to edge. Alternatively, the magnet 152 may extend across only a portion of the length of the closure 150, or a plurality of magnets may be disposed along the edge of the closure 150. The magnet 152 may be sized and disposed to magnetically couple with the ferrous plate 154, which may be attached to a top edge of the left sidewall 22. For example, if the ferrous plate 154 has a magnetic charge, then the magnet 152 may have a north pole oriented towards the tailgate 56 of the truck 100 and a south pole oriented towards the cab wall 26 of the truck 100, whereas the ferrous plate 154 may have a south pole oriented towards the tailgate 56 of the truck 100 and a north pole oriented towards the cab wall 26 of the truck. Or vice versa. Where the ferrous plate comprises a non-magnetic material that has no polarity, the magnet 152 may simply be configured to couple to the ferrous plate 154 by being disposed to have surface areas that abut one another when the closure 150 is pulled to the extended configuration. For example, the magnet 152 may be configured to have at least 20 sq. in., 30 sq. in, or 50 sq. in. of surface area that abuts the ferrous plate 154 attached to the top edge of the left sidewall 22.

When a user pulls the closure 150 towards the extended configuration via the front track 122 of the front frame 120 and the rear track 112 of the rear frame 110, the magnet 152 may be pulled towards the ferrous plate 154 via a magnetic force. As shown in FIG. 9, the magnet 152 may magnetically attach to the ferrous plate 154 via a magnetic connection, holding the closure 150 in place relative to the left sidewall 22. When a user wishes to move the closure 150 from the extended configuration shown in FIG. 9 to the storage configuration shown in FIG. 7, the user may then detach the magnet 152 from the ferrous plate 154 and allow the spring 139 shown in FIG. 7 to pull the closure 150 into the storage box 130. The magnet 152 may be an electromagnet that activates or deactivates when a user activates a switch, such as the switch 151 shown in FIG. 7. The switch 151 may comprise a push button, that may connect or disconnect the electromagnet 152 from a power supply. When a user pushes the button 151, the electromagnet may deactivate, allowing the user to easily disengage the magnet 152 from the ferrous plate 154 and allow the closure 150 to return back into the storage box 130.

While FIG. 9 shows that element 152 is a magnet and element 154 is a ferrous plate, element 154 may be a magnet and element 152 may be a ferrous plate, or both elements 152 and 154 may comprise magnets to hold the closure 150 in the extended configuration. While the closure 150 is shown as being deployed out of the storage box 130 from the right sidewall 24 to the left sidewall 22 to allow for the magnet 152 to mate with the ferrous plate 154, the closure 150 may be deployed from the left sidewall 22 to the right sidewall 24 by reversing the storage box 130 and attaching it to the left sidewall 22, and coupling the ferrous plate 154 to the top edge of the right sidewall 24. While only one closure 150 is shown as being extended from the right sidewall 24 to the left sidewall 22, a plurality of similar closures may be extended from the right sidewall 24 to the left sidewall 22, positioned parallel to one another between a plurality of frames extended between the left sidewall 22 and the right sidewall 24. The closure 150 and the frames 110 and 120 when in the deployed state shown in FIG. 9 may be waterproof so that rain water does not and cannot enter the truck bed area 21. To this end, the junctions between the closure 150 and the frames 110 and 120 may have rubber seals or other sealing mechanisms for keep the water out of the truck bed area 21.

As shown in FIG. 10, an alternative truck 100 may have a closure 160 comprising a series of slats 162. The slats may be rigid, in contrast to the flexible closure 140 of FIG. 1 and closure 150 of FIG. 8. The configuration of the rigid slats 162 may be seen more clearly in the cross-sectional view of closure 160 in FIG. 12, which shows each slat 162 rotatably coupled to an adjoining slat via a strut joint 163. Each slat 162 may be configured to rotate about a strut joint by at least 20, 30, 40, or even 45 degrees to allow for the closure 160 to be extendible along the upper front track 122 of upper front frame 120 and the upper rear track 112 of the upper rear frame 110. The strut joints 163 may have a slider, similar to the slider 148 of FIG. 3, which ensures that the strut joints follow the upper front track 122 and the upper rear track 112 while a user moves the closure 160 between the storage configuration shown in FIG. 12 and the extended configuration shown in FIG. 11.

Since the closure 160 comprises a series of rigid struts, the storage box 170 that holds the closure 160 may be configured to wrap around the perimeter of the truck bed 21, as shown in FIG. 12. The storage box 170 may comprise a width 174 and a height 175 which allows for the storage box 170 to hold a volume that may comfortably hold a closure 160 that extends over a truck bed 21, such as a width of at least 50 inches, and a height of at least 20 inches. The storage box 170 may have a gap 172 that allows the slats of the closure 160 to enter the storage box 170 when a user moves the closure 160 into the storage configuration shown in FIG. 12. The gap 172 may have a width 173 of at most 1 inch to allow for the slats to flex while entering the storage box 170 due to vibrational forces.

As shown in FIG. 11, the storage box 170 may have a lower front frame 180 and a lower rear frame 190 that may be used to guide the closure 160 into place inside the storage box 170. The lower front frame 180 may have a lower front track 182 (shown in FIG. 11), similar to the upper front track 122 of the upper front frame 120 (shown in FIG. 10), and the lower front frame 190 may have a lower front track 192 (shown in FIG. 11), similar to the upper rear track 112 of the upper rear frame 110 (shown in FIG. 10). The lower front track 182 may be juxtaposed with the upper front track 122 to allow for a slider coupled to the lower front track 182 to slide into the upper front track 122 when a user moves the closure 160 towards the extended configuration, and for a slider coupled to the upper front track 122 to slide into the lower front track 182 when a user moves the closure 160 towards the storage configuration. Likewise, the lower rear track 192 may be juxtaposed with the upper rear track 112 to allow for a slider coupled to the lower rear track 192 to slide into the upper rear track 112 when a user moves the closure 160 towards the extended configuration, and for a slider coupled to the upper rear track 112 to slide into the lower rear track 192 when a user moves the closure 160 towards the storage configuration.

While the closures 140 (FIG. 1), 150 (FIG. 8), and 160 (FIG. 9) are shown here as extended from a right sidewall 24 to a left sidewall 22, retractable closures may be used that extend from the left sidewall 22 to the right sidewall 24 by reversing the design and orientation of the storage boxes 130 and 170, respectively, about the truck bed 21. While only one closure is shown that extends across an entire length of the truck bed 21, a plurality of closures may be used by disposing a plurality of frames across the length of the left sidewall 22 and the right sidewall 24 to closure different sections of the truck bed 21 between the cab wall 26 and the tailgate 56. While the closure 160 is shown as being deployed out of the storage box 170 from the right sidewall 24 to the left sidewall 22, the closure 160 may be deployed from the left sidewall 22 to the right sidewall 24 by reversing the configuration of the storage box 170 relative to the left sidewall 22 and the right sidewall 24. The closure 160 and the frames 110 and 120 when in the deployed state shown in FIG. 11 may be waterproof so that rain water does not and cannot enter the truck bed area 21. To this end, the junctions between the closure 160 and the frames 110 and 120 and the strut joints 163 may have rubber seals or other sealing mechanisms for keep the water out of the truck bed area 21.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A retractable closure for a truck having a cab and truck bed, comprising:
   a front frame attachable to a front section of a first sidewall of the truck bed and a front section of a second sidewall of the truck bed, wherein the front frame comprises an upper front track;
   a rear frame attachable to a rear section of the first sidewall of the truck bed and a rear section of the second sidewall of the truck bed, wherein the rear frame comprises an upper rear track; and
   a single closure that is movable between a stored configuration and an extended configuration, wherein the closure encloses a portion of the truck bed between the first sidewall and the second sidewall when the closure is in the extended configuration, and wherein the closure is not disposed to enclose the truck bed between the first sidewall and the second sidewall when the closure is in the stored configuration.

2. The retractable closure of claim 1, further comprising a storage box disposed along the first sidewall and a base of the truck bed.

3. The retractable closure of claim 2, wherein the front frame is attachable to the cab of the truck.

4. The retractable closure of claim 2, wherein the storage box have a pin with a spring that biases the pin to pull an end of the closure to wrap the closure around the pin to move the closure from the extended configuration to the stored configuration.

5. The retractable closure of claim 4, further comprising a locking mechanism that locks the closure in the extended configuration to prevent the spring from pulling the end of the closure to move the closure from the extended configuration to the stored configuration.

6. The retractable closure of claim 2, wherein the closure comprises a flexible fabric.

7. The retractable closure of claim 2, wherein the closure comprises a plurality of slats joined together by strut joints.

8. The retractable closure of claim 2, wherein when the closure is in the stored configuration, the truck bed is accessible from above the truck bed, and wherein when the closure is in the extended configuration, the retractable closure forms an enclosed interior volume over the truck bed.

9. A retractable closure truck bed system, comprising:
   a truck having a cab defining a roof and a truck bed defining first and second sidewall and a tailgate; and
   a retractable closure, having:
      a front frame attachable to a front section of the first sidewall and a front section of the second sidewall;
      a rear frame attachable to a rear section of the first sidewall and a rear section of the second sidewall; and
      a single closure that is movable between an extended configuration and a stored configuration, wherein the single closure may be moved between the extended configuration that encloses the truck bed and the stored configuration that opens the truck bed along a length of the front frame and the rear frame.

10. The retractable closure truck bed system of claim 9:
   wherein the front frame comprises a front track, wherein the rear frame comprises a rear track, and wherein the closure comprises a pair of sliders mounted to the front track and the rear track, respectively; and
   wherein the closure is movable between the extended configuration and the stored configuration by traveling along the front track and the rear track.

11. The retractable closure truck bed system of claim 9 further comprising a storage box attached to and disposed along the first sidewall and a base of the truck bed, wherein the storage box is sized and configured to contain the single closure in a rolled configuration when the single closure is in the storage position.

12. The retractable closure truck bed system of claim 9, wherein the front frame is attachable to sidewalls of a truck.

13. The retractable closure truck bed system of claim 9, wherein the front frame is attachable to a body of the cab.

14. The retractable closure truck bed system of claim 9, further comprising a closure storage box having a pin with a spring that biases the pin to pull an end of the closure to wrap the closure around the pin.

15. The retractable closure truck bed system of claim 14, further comprising a locking mechanism that locks the single closure in the extended configuration to prevent the spring from pulling the end of the single closure to wrap the single closure around the pin.

* * * * *